(12) United States Patent
Rapaport et al.

(10) Patent No.: US 8,415,076 B2
(45) Date of Patent: Apr. 9, 2013

(54) GAS DIFFUSION LAYER PRECONDITIONING FOR IMPROVED PERFORMANCE AND OPERATIONAL STABILITY OF PEM FUEL CELLS

(75) Inventors: Pinkhas A Rapaport, Fairport, NY (US); Yeh-Hung Lai, Webster, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1127 days.

(21) Appl. No.: 11/272,369

(22) Filed: Nov. 10, 2005

(65) Prior Publication Data

US 2007/0105006 A1    May 10, 2007

(51) Int. Cl.
*H01M 4/02* (2006.01)
*H01M 4/36* (2006.01)
*H01M 8/00* (2006.01)

(52) U.S. Cl.
USPC .......................................... 429/535; 429/523

(58) Field of Classification Search .............. 429/12–46, 429/535
See application file for complete search history.

(56) References Cited

U.S. PATENT DOCUMENTS

| 6,936,362 B2 | 8/2005 | Chapman et al. | |
| 2002/0034670 A1* | 3/2002 | Suenaga et al. | 429/30 |
| 2002/0197525 A1* | 12/2002 | Tomita et al. | 429/44 |
| 2003/0134178 A1* | 7/2003 | Larson | 429/44 |
| 2003/0175575 A1 | 9/2003 | Zuber et al. | |
| 2005/0042500 A1 | 2/2005 | Mathias et al. | |

FOREIGN PATENT DOCUMENTS

| JP | 2002-343379 A | 11/2002 |
| JP | 2004-087400 A | 3/2004 |
| JP | 2005-15834 A | 6/2005 |
| JP | 2005-158342 A | 6/2005 |
| WO | 2004093215 A2 | 10/2004 |

OTHER PUBLICATIONS

Chinese Office Action (translation) corresponding to U.S. Appl. No. 11/272,368, dated May 8, 2009.
English translation of Japanese Office Action dated Jun. 3, 2010 for Japanese Patent Application No. 2006-305150, corresponding to U.S. Appl. No. 11/272,369.
German Office Action dated Jul. 13, 2012 for German Patent Application No. 10 2006 052 719.4, corresponding to U.S. Appl. No. 11/272,369.

* cited by examiner

*Primary Examiner* — Barbara Gilliam
*Assistant Examiner* — Steven Scully (57) ABSTRACT

A method for reducing the compression set of GDL during the fuel cell operation and a method for reducing the intrusion of the GDL into flow-field channels, both achieved by pre-compression preconditioning the GDL before placing it into the fuel cell. This preconditioning is performed in order to reduce the loss of compression during the life of the stack and the mal-distribution of reactant gases, and ultimately achieve the benefits of higher power output and more stable performance.

12 Claims, 7 Drawing Sheets

*Prior Art*

GAS DIFFUSION LAYER PRECONDITIONING FOR IMPROVED PERFORMANCE AND OPERATIONAL STABILITY OF PEM FUEL CELLS

TECHNICAL FIELD

The present invention relates to PEM fuel cells more particularly to a method of improving the performance of the GDL diffusion media thereof by providing pre-compression thereto.

BACKGROUND OF THE INVENTION

A fuel cell is an electrochemical energy conversion device. It converts energy from the chemical reaction of the fuel and the oxidant into electrical energy. Fuel cells have been proposed for use in both stationary applications, such as power plants, as well as smaller, portable applications, such as electrical vehicular power plants, which would replace the internal combustion engine in automobiles. The term "fuel cell" is typically used to refer to either a single cell or a plurality of cells, also called a stack, commonly arranged in series.

Figure 1:
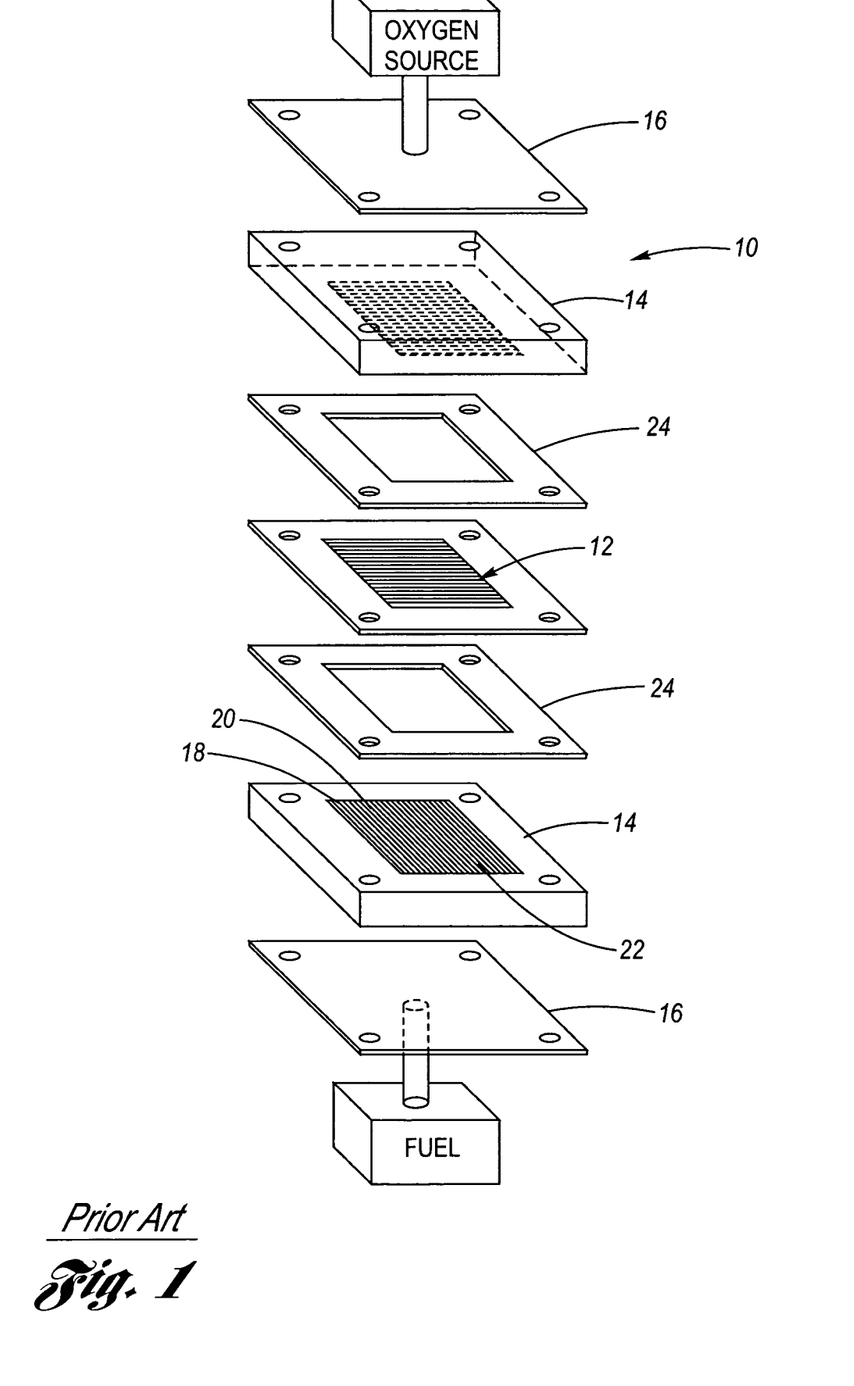
FIG. 1 is an exploded perspective view of a conventional PEM fuel cell stack.

In proton exchange membrane (PEM) fuel cells, hydrogen or hydrogen containing gas is supplied as the fuel to the anode of the fuel cell and oxygen or oxygen containing gas, for example air, is supplied as the oxidant to the cathode of the fuel cell. With particular reference to FIG. 1, a mono-cell PEM fuel cell 10 is shown having a membrane electrode assembly 12 sandwiched between a pair of electrically conductive electrode plates 14. This configuration is repeated in series to form PEM fuel cell stacks, where the plurality of mono-cells is separated from each other by bipolar electrode plates. The plates 14 may be made of a composite of conductive materials and polymer binders, graphite, or corrosion resistant metals. The membrane electrode assembly (MEA) 12 and electrode plates 14 are clamped together between rigid end plates 16. The electrode plates 14 each contain a plurality of lands 18 defining a plurality of flow channels 20 that form a flow field 22 for distributing reactant gases, for example, $H_2$ and $O_2$, to opposing faces of the MEA 12. In the case of a multi-cell PEM fuel cell stack, a flow field is formed on either side of the bipolar plate, one for the $H_2$ and one for the $O_2$. Nonconductive gaskets 24 provide seals and electrical insulation between the several components of the fuel cell 10. Electronically isolated bolts, not depicted here, extend through holes located at the corners of the several components for clamping the PEM fuel cell 10 together.

Figure 2:
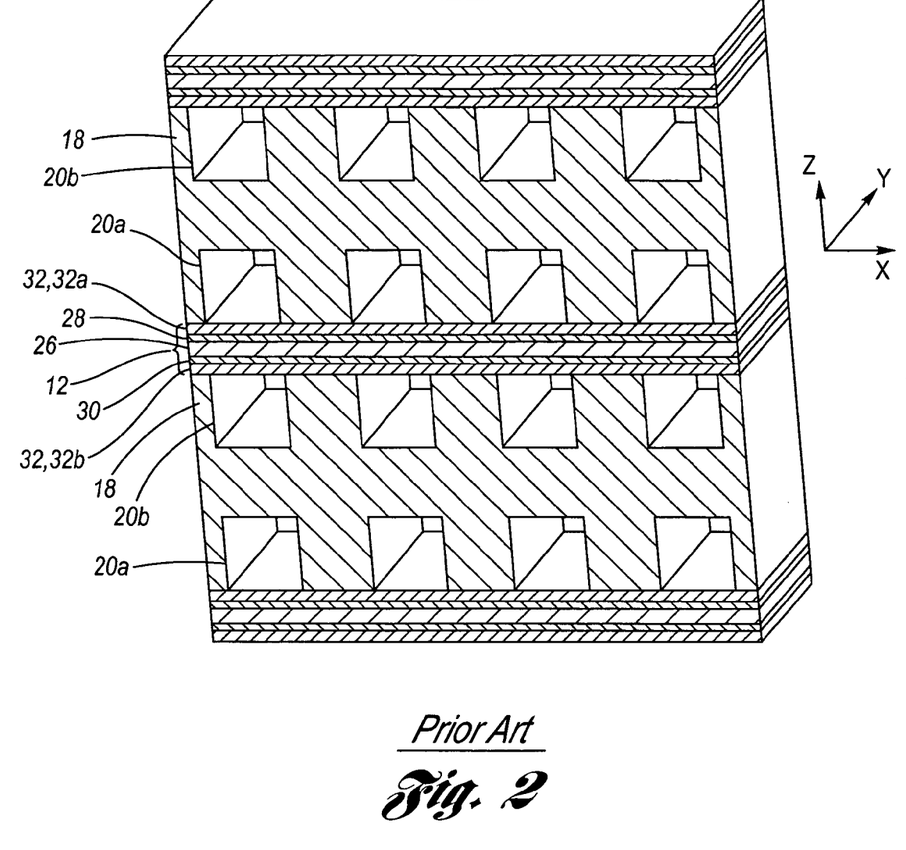
FIG. 2 is a perspective cross-sectional view of the PEM fuel cell stack of FIG. 1, showing layering and including the MEA and the diffusion media.
Figure 3:
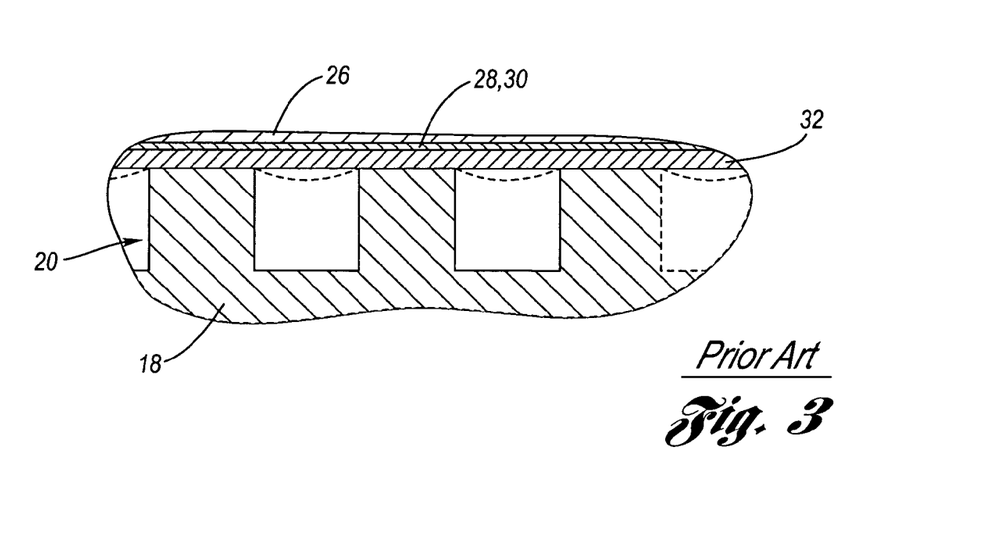
FIG. 3 is a detail cross-sectional view of a portion of FIG. 2.
Figure 4:
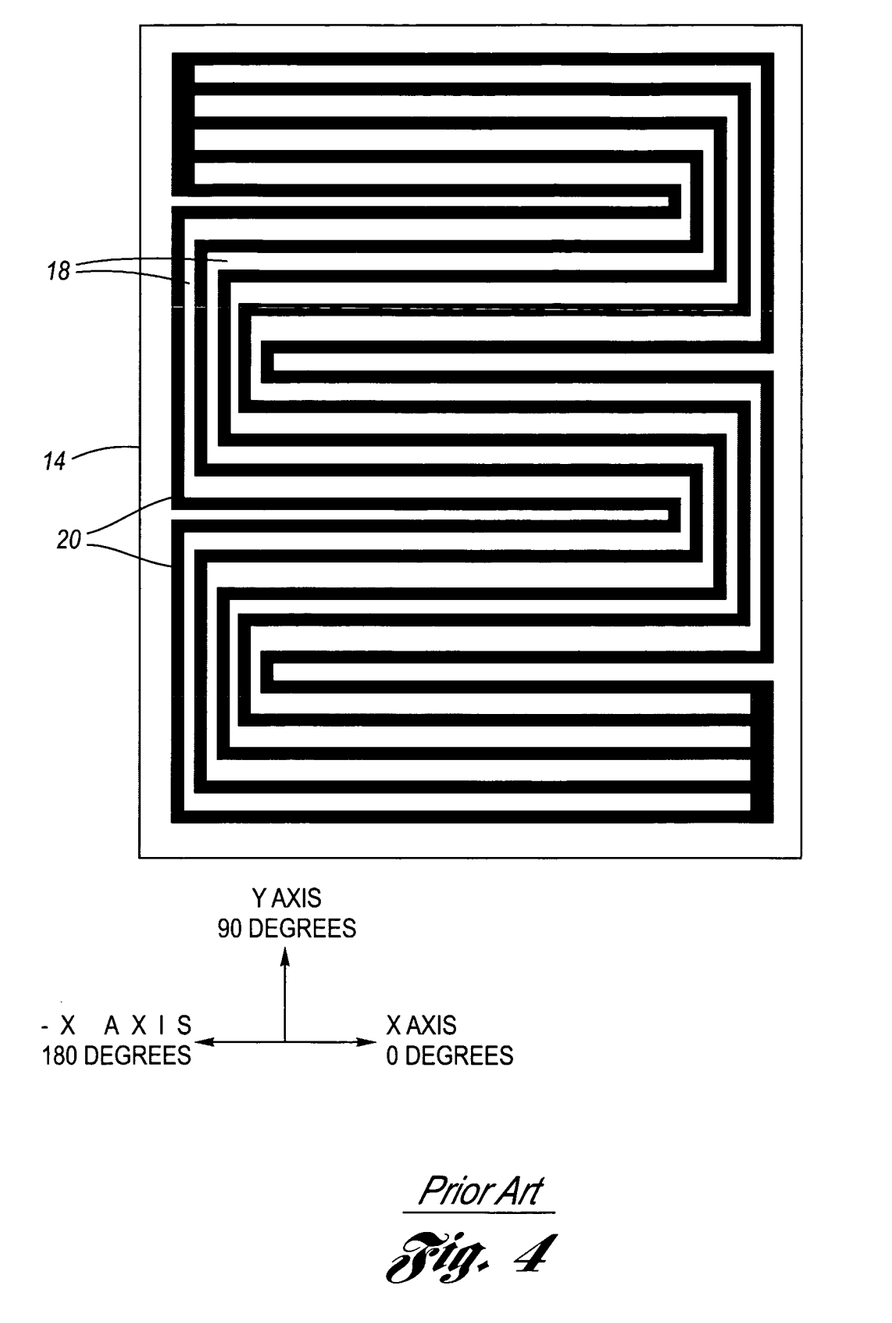
FIG. 4 is a plan view of an exemplary flow field of the PEM cell stack depicted in FIG. 1.

With particular reference to FIGS. 2 and 3, the MEA 12 includes a membrane 26 sandwiched between an anode catalyst layer 28 and a cathode catalyst layer 30, an anode diffusion media 32a and a cathode diffusion media 32b. The anode diffusion media 32a and the cathode diffusion media 32b can be referred to generically and collectively as a gas diffusion layer (GDL), or as a gas diffusion media (GDM). As shown, $H_2$ flow channels 20a that form the anode side $H_2$ flow field, lie immediately adjacent the anode diffusion media 32a and are in direct mutual contact. Similarly, $O_2$ flow channels 20b that form the cathode side $O_2$ flow field lie immediately adjacent the cathode diffusion media 32b and are in direct mutual contact. FIG. 4 illustrates the spatial relationship between the channels and the lands and shows their distribution over the face of the electrode plates.

In operation, an $H_2$ rich stream flows into an inlet side of the anode side flow field and concurrently, an $O_2$ stream (or alternatively air) flows into an inlet side of the cathode side of the flow field. $H_2$ flows along the anode side of the MEA 12 and the presence of the anode catalyst 28 causes the $H_2$ to dissociate into hydrogen ions ($H^+$) with each hydrogen atom contributing an electron. The electrons travel from the anode side, through the bipolar plate to the cathode of the adjacent cell, closing an electric circuit, not shown, which thereby may be used to perform work. The membrane layer 26 is a selective medium which allows positively charged protons to flow through but does not allow the negatively charged electrons to flow through. Thus, the $H^+$ ions can flow directly through the membrane to the cathode catalyst 28. At the cathode side, the protons combine with oxygen atoms and the electrons flowing through the electric circuit, forming water, $H_2O$. These processes are typically occurring as the reactants flow through their respective flow fields. This results in a pooling of water near the outlet side of the reactant gas channels.

Usage of the GDL 32 is desirable because it allows for relatively even distribution of the reactants in the active area of an operating fuel cell. This distribution is accomplished through the diffusion of the reactants from the flow channels 20 through the GDL 32 and into contact with their respective catalysts thereby facilitating the required reactions. The GDL 32 also assures good electrical contact across the fuel cell stack.

The GDL 32 also facilitates the back diffusion of the primary product of the fuel cell reactions, namely $H_2O$. The redistribution of $H_2O$ across the PEM fuel cell 10 is of critical importance in the performance of the cell. A more uniform hydration of the PEM fuel cell 10 allows for better contact between the reactants and the electrodes, and therefore betters performance.

The use of the GDL 32 improves the performance and stability of the PEM fuel cell 10. The GDL 32 is sufficiently permeable to reactant gases and liquid water under the lands 18 and between the flow channels 20. The electrical conductivity of the GDL 32 is sufficiently high allowing the transport of the electrons over the flow channels 20 between the lands 18 and the MEA 12.

The most commonly used diffusion media material of the GDL 32 is carbon fiber paper, such as for example made by Toray of Japan, Specracorp of Massachusetts, and SGL of Germany. Each of these products is produced through similar processes. Carbon fibers are dispersed in water, before being drawn across a uniform surface. The surface is often a wire mesh or a drumhead apparatus. The gas diffusion media material is allowed to dry and then is ready for further processing.

Figure 5:
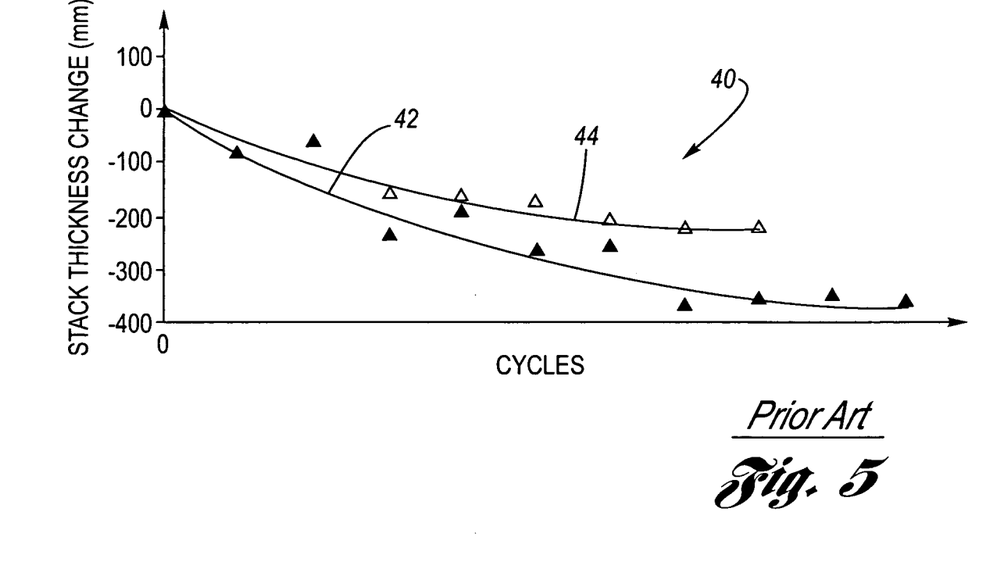
FIG. 5 is a graph depicting plots of the thickness change of two stacks with different materials used for the GDL of FIG. 1 subject to a number of operating cycles of the stack over time.

It is known in the art that the GDL 32 will take on a compressive set, which is a geometrical distortion of the GDL thickness under pressure over the course of the operation of a PEM fuel cell 10. In this regard, FIG. 5 shows a graph 40 of stack thickness change versus number of operation cycles for two fuel cell stacks with two different "as-received" commercial GDL materials, represented by plot 42 and plot 44. In both stacks, the stack thickness change vs. initial value increases as the number of operating cycles increases. As the number of operating cycles gets sufficiently high, the thickness change per cycle decreases, and it eventually reaches a steady state. Plot 42 is for a GDL material which is relatively soft and generally more prone to adopting a compressive set as compared to plot 44 for a GDL material which is relatively firm and less flexible. This results in the GDL material of plot 42 having larger stack thickness change than the GDL material of plot 44, and, thus, requiring more cycles of operation before it reaches a steady state, where no further thickness change occurs.

One of the consequences of the compressive set is that it may result in significant loss of compression pressure in the fuel cell stack. Loss of compression pressure will cause an increase in contact resistance and thereby degrade the performance of the fuel cells, particularly when high power output is needed.

Figure 6:
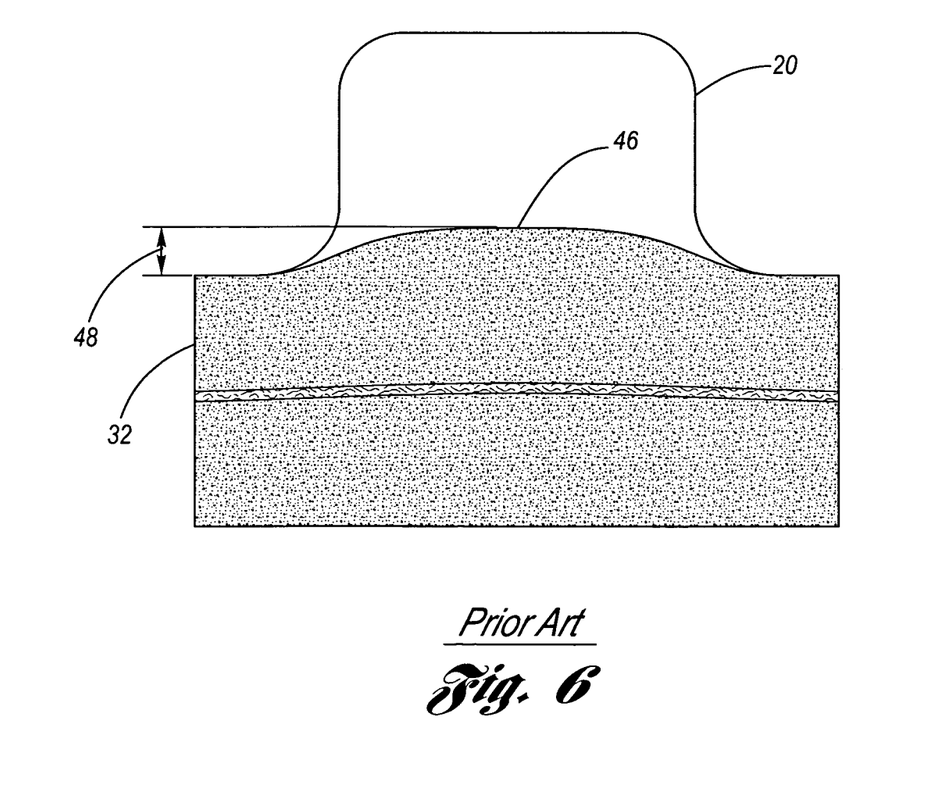
FIG. 6 is a schematic representation of an intrusion of the GDL into a gas flow channel as occurs in the prior art.

Another consequence of the compressive set of the GDL material is an intrusion of the material into the flow channels 20. Referring to FIG. 6, the GDL 32 has an intrusion 46 into the flow channel 20 having a magnitude of GDL intrusion displacement 48. Due to the variability of the thickness and/or of the compressive mechanical properties of the GDL 32, the magnitude of GDL intrusion displacement 48 will vary from cell to cell or even within the same cell. A consequence of the intrusion 46 is that it can significantly alter the flow distribution of the reactant gases. Any significant misdirection of the reactants within the fuel cell stack will cause power instability and it will require operation under elevated stoichiometric conditions, which is disadvantageous for the fuel cell. It is contemplated that by reducing the magnitude of intrusion displacement 48, the sensitivity of reactant gases flow distribution to the variability of GDL thickness and compressive mechanical properties can be reduced.

In order to prevent fuel cell compression loss over time, three principal strategies have been developed in the prior art. A bladder type compression device has been used to maintain a constant stack compression force; however, this device is bulky and not useful for automotive applications. Recompression of the stack as part of a standard maintenance regimen can reset the condition; however, this process requires removal of fuel cell stacks from the system and does nothing to improve the non-uniform nature of the intrusions into the reaction channels. Lastly, staged compression assumes the compression load will increase in several steps with a few stack operation hours between such steps until the compression pressure reaches a nominal value; however, while further compression loss is prevented and the GDL intrusion problem is partly solved, it creates an unacceptable delay in the placing of the stacks into the system.

What remains needed in the art, therefore, is a method that would reduce non-uniformity of compressive mechanical properties between GDL sheets, lessen the intrusion of the sheets into the flow channels, and eliminate the loss of compression during the life of the stack.

SUMMARY OF THE INVENTION

The present invention is a method to reduce the compression set of a GDL during fuel cell operation by pre-compression preconditioning the GDL before placing it into the fuel cell (ie., ex-situ with respect to the fuel cell). The present invention can reduce the loss of compression during the life of the stack and reduce the mal-distribution of the reactant gases. Ultimately, the present invention can achieve the benefits of higher power output and more stable fuel cell performance. Experiments performed on a stack equipped with displacement sensors indicate that the compression set that the fuel cell stack exhibits over time due to the GDL compressive properties, happens over the first several operating (ie., on/off) cycles in stack operation. The number of these cycles depends on the particular type of GDL used in the stack assembly, as well as the stack operating conditions. Preconditioning by pre-compression of the GDL ex-situ the fuel cell mimics this compression set before actual placing into the fuel cell, thereby reducing excessive and non-uniform intrusion into the reactant channels and eliminating the need for future re-compression of the fuel cell stack due to the loss of compression pressure.

Preconditioning by pre-compression of the GDL will not require any additional compression maintenance. The main advantage of this kind of GDL preconditioning is that it can be made at a manufacturing facility, without any relation to the choice of end-use stack assembly, which is especially attractive in case of mass production.

Accordingly, it is an object of the present invention to lessen the intrusion of the sheets into the flow channels, and to eliminate the loss of compression during the stack life, resulting in better reactant flow distribution and stable contact resistance This and additional objects, features and advantages of the present invention will become clearer from the following specification of a preferred embodiment.

DESCRIPTION OF THE PREFERRED EMBODIMENT

FIGS. 7 through 12 depict various aspects of the present invention.

Experiments were performed using a process of ex-situ compression. By "ex-situ" is meant the process by which the GDL is compressively preconditioned outside the stack environment (ie., external to the fuel cell). In this ex-situ preconditioning, different types of GDL are subjected to specific compression loads (ie., pressure applications) for specific durations with a mixture of compression load cycles and times and at least one complete compression unloading (ie., pressure release), producing compression sets comparable to those produced under stack operating conditions over a number of operating cycles. The effect of the mixture of compression load cycles and times will be discussed with respect to FIG. 7, and the effect of complete compression unloading will be discussed with respect to FIG. 8. The combined effect of mixture of compression load cycles and complete compression unloading will be discussed with respect to FIG. 9.

Figure 7:
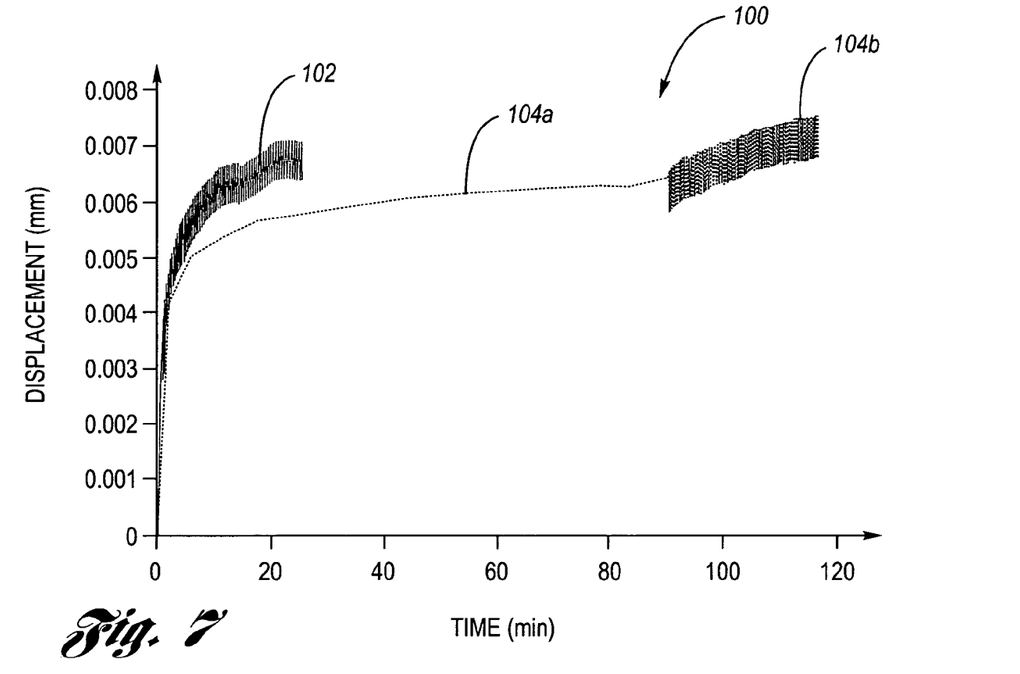
FIG. 7 is a graph of experimental data demonstrating the additional thickness change for GDLs subjected to cyclic pre-compression or constant pre-compression after a stack compression load is reached.

FIG. 7 is a graph 100 of a GDL material subjected to ex-situ preconditioning by application thereto of compression (ie., compressive pressurization). In plot 102 the material is subjected to a plurality of cyclic compressive pressurizations, wherein the GDL material is subjected to a plurality of compressive pressurization cycles with the magnitude of this pressure varying over the time of one cycle. Plot 104 shows the same material under constant pressure (compression) for an extended period of time at plot 104a, before application of a plurality of cyclic pressurizations is performed at plot 104b. The y axis in this graph represents the additional thickness change after the compression load, 2.76 MPa in this example, is reached. Plot 104 shows that GDL in stack operation would experience at least an additional 0.0075 mm of thickness change after the fuel cell stack is assembled at the design compression load. To reduce this additional thickness change in stack operation, one can utilize the present invention by preconditioning through cyclic compression loading, constant compression loading over an extended period of time, or the combination of both. For example, using the present invention, approximately 70 percent of the total additional thickness change over time can be induced in 10 compression load cycles within 2.6 minutes or by holding the compression load over 5.3 minutes.

Figure 8:
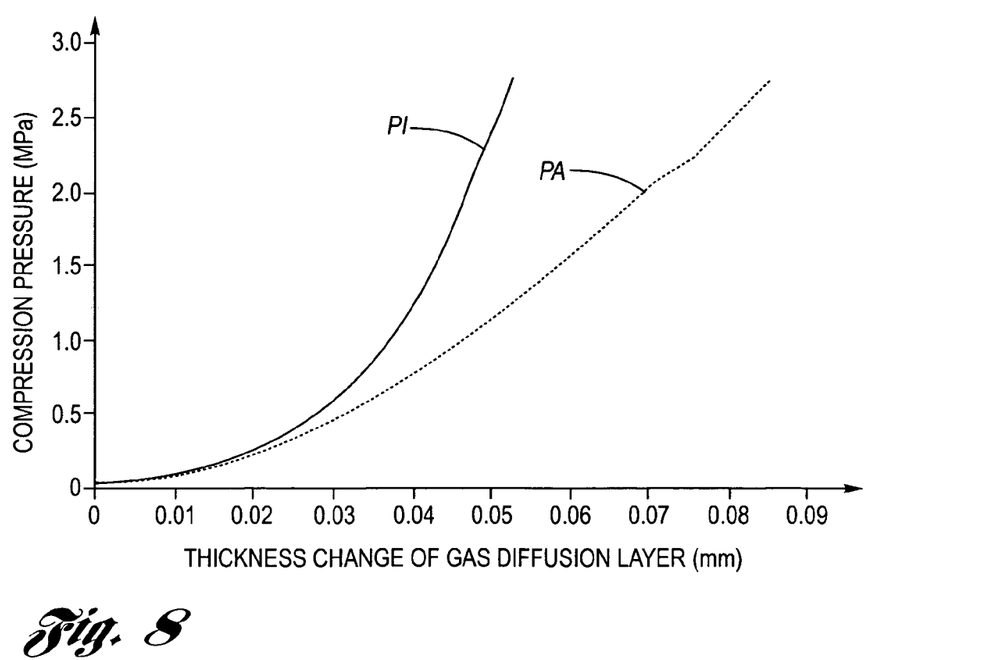
FIG. 8 is a graph of experimental data of compression pressure (ie., compression load) versus thickness change of two GDL materials, demonstrating the effect of complete compression unloading according to the present invention.

FIG. 8 demonstrates the effect of complete compression unloading on the thickness change. In this graph, two GDL materials are monotonically compression loaded to a predetermined stack compression load, 2.76 MPa in this example. The compression loading behavior of the prior art GDL material (as received from a GDL manufacturer) is denoted as "PA" which shows a dimension change of 0.085 mm at the set compression load. The compression loading behavior of the present invention GDL material (preconditioned by a fast compression loading of up to 2.76 MPa and a complete compression unloading) is denoted as "PI" which shows a dimension change of 0.053 mm at the set compression load.

Based on the results from FIGS. 7 and 8, it is contemplated that the GDL pre-conditioned by the present invention (plurality of cyclic and timed delayed loading followed by at least one complete compression unloading) would have at least 0.0039 mm less thickness change compared to the prior art GDL from the stack operation.

Figure 9:
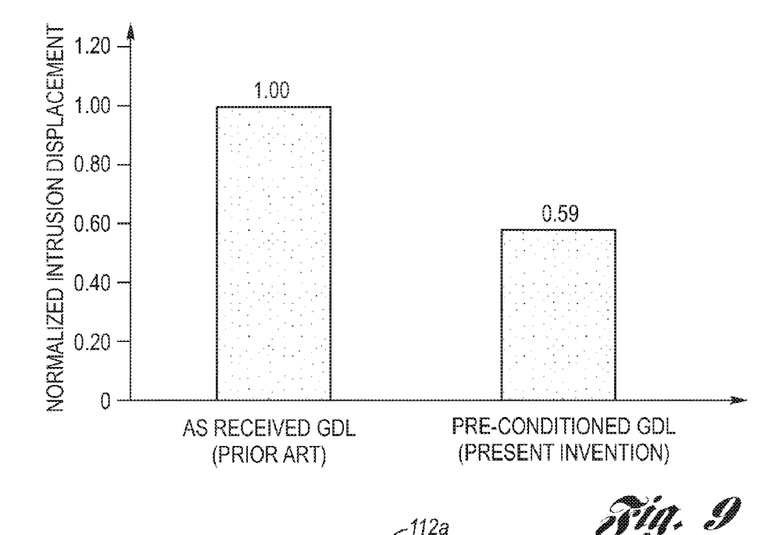
FIG. 9 is a graph demonstrating the reduction of intrusion displacement using the present invention.

FIG. 9 depicts the results from using such a preconditioned GDL material in the stack through the comparison of the intrusion displacement between a prior art GDL and a preconditioned GDL using the present invention for a compression that is normally used in the fuel cell. The intrusion displacement is calculated using a commercially available finite element program. The intrusion displacement is normalized by the prior art intrusion displacement for easy comparison. It is seen that the GDL of the present invention has an intrusion displacement which is 59 percent of that of the GDL of the prior art, which clearly shows the benefit of the present invention.

The present invention calls for the GDL material to be pre-conditioned through subjection to pressure outside of the stack. The method of the application of compression (ie., subjecting the GDL material to compressive pressure, or compression loading) can take many forms.

Figures 10A, 10B, 10C:
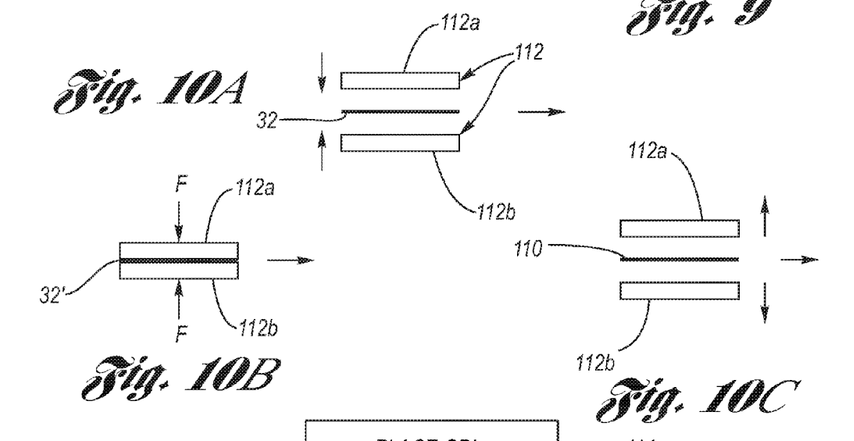
FIGS. 10A through 10C are a schematic representation of operative steps of a compression apparatus, illustrating an ex-situ compression process to precondition at least one GDL by applying constant force over time according to the present invention.

By illustration, FIGS. 10A through 10C show an exemplar compression process using a moving plate type compression apparatus; other types of compression apparatus can be used, such as compressive wheels. A compression apparatus 112 consists of an upper face 112a and lower face 112b which are movable with respect to one another. At least one sheet of GDL 32 is placed into the compression apparatus 112, as shown in FIG. 10A. In FIG. 10B the compression apparatus is actuated, whereupon the upper and lower faces 112a and 112b are pressed toward each other, resulting in a compression loading of the one or more sheets of GDL 32' (see plot 104a of FIG. 7). FIG. 10C shows the now compressed and, thereby, preconditioned at least one sheet of GDL 110 being released from the compression apparatus 112 (ie., complete compression unloading) after mutual separation of the upper and lower faces 112a and 112b.

EXAMPLE I

A GDL material composed of a carbon fiber paper was selected, having an initial compressed thickness of about 230 micrometers. It was determined that this material used as a GDL layer in a PEM fuel cell (ie., in-situ) acquired a compression set after about 20 hours of stack operation, so that the compressed thickness under stack compression load became 165 micrometers. According to the method of the present invention, an identical GDL material was preconditioned by being compressed (ie., compression loaded) outside the fuel cell and before its assembly (ie., ex-situ), wherein the GDL material was subjected to 2.1 MPa for 2 hours and then completely compression unloaded. The GDL material thereby acquired a compression set so that the compressed thickness became 195 micrometers before being used in a fuel cell stack. The preconditioned GDL material was then used as a GDL layer in a PEM fuel cell, wherein it was determined that the compression set remained generally stable over operation of the fuel cell for 400 hours. Accordingly, the estimated magnitude of the intrusion into the reactant channels decreased from about 65 micrometers when using un-preconditioned (ie., prior art) GDL to between about 23 micrometers when using preconditioned GDL.

Figure 11:
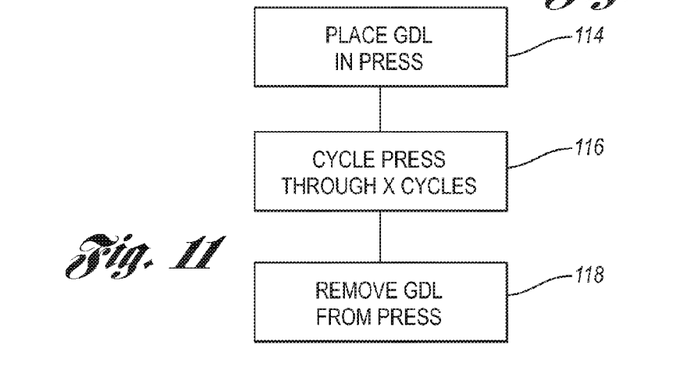
FIG. 11 is a flow chart of steps of another ex-situ compression process for preconditioning at least one GDL by cycling the compression force according to the present invention.

Alternatively, FIG. 11 illustrates how cyclic compression (or pressurization) loading steps may be implemented using, merely by way of example, the compressive apparatus 112 of FIGS. 10A through 10C (see plots 102 and 104b of FIG. 7). The placement step 114 of the GDL is similar to that described with respect to FIG. 10A. The intermediate step 116 involves multiple repetitions of compression loading and compression unloading or compression release (at least partial compression release) cycles of the at least one sheet of GDL, via repeated actuation and release of the upper and lower faces 112a and 112b of the compression apparatus 112 of FIGS. 10A through 10C. In the final step 118, after the completion of a predetermined number of cycles, the at least one sheet of preconditioned GDL is released from the compression apparatus.

It is to be noted that there are many other ways to provide preconditioning of the GDL; for example, increasing the temperature can shorten the time required for pre-compression, etc. The main object is to create a compression set, equivalent, or close, to the one that takes place in an operating stack over time before placing the at least one sheet of GDL sheet into the stack.

EXAMPLE II

Figure 12:
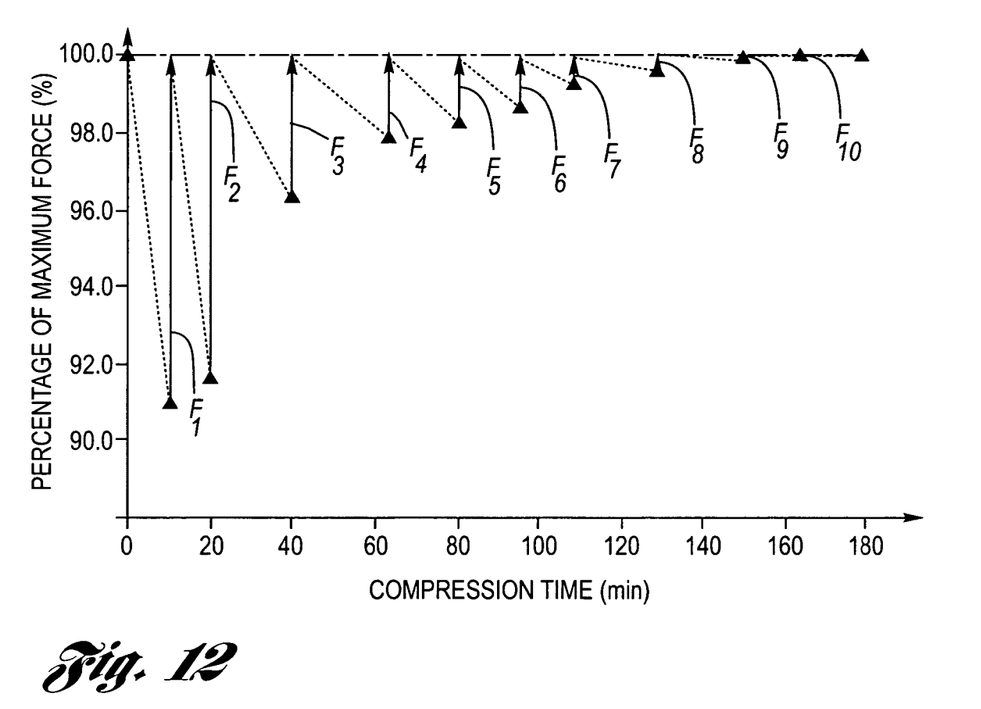
FIG. 12 is a chart of periodic compression corrections as described in Example II.

Preconditioning of the GDL for a fuel cell build by pre-compression similar to that referred in Example I was made in a batch process. A set of 100 sheets of GDL material was precut to predetermined size and stacked in a pile, wherein each GDL sheet was separated from the next one by a plastic shim of approximately 250 micrometers thick. This pile was then placed in a compression apparatus (see FIGS. 10A through 10C), and the same pressure of 2.1 MPa was applied so as to simultaneously compress all the sheets, but this time, for research purposes, the duration was 3 hours. The GDL sheets acquired a compression set over time, so the actual compression load also decreased over time. Therefore, every 10 to 20 minutes, as depicted at FIG. 12, the compression force was checked and adjusted, see $F_1$ through $F_{10}$, to the initial compression load value. After 2 hours under compression load, the residual compression force was about 99 percent of the initial value, wherein after 2 hours not much more compression set was expected.

Further, while GDL sheet may be supplied conventionally whereby a step of pre-compression during the manufacturing process occurs, this step subjects the GDL to one or two cycles of compression by transporting GDL through rollers of fixed separation (calendaring). The main reason of doing this in the prior art manufacturing process is to control the thickness uniformity. Furthermore, the time that GDL actually spends in this kind of "pre-compression" is very short. Data shows that one or two compression cycles used in the prior art manufacturing process is not sufficient to achieve the object of the present invention. Instead, at least 10 cycles or 1 minute are needed for some GDL materials, but normally more than that (see FIG. 9).

The above description of the preferred embodiment is merely exemplary in nature and is in no way intended to limit the invention, its applications, and its uses. Further, to those skilled in the art to which this invention appertains, the above-described preferred embodiment may be subject to change or modification. Such change or modification can be carried out without departing from the scope of the invention, which is intended to be limited only by the scope of the appended claims.

The invention claimed is:

1. A method for preconditioning a gas diffusion layer for a fuel cell prior to assembly of the fuel cell, comprising the steps of:
   determining a structural configuration of a fuel cell;
   selecting a gas diffusion layer material for the fuel cell;
   determining responsive to the structural configuration a compression set that the gas diffusion layer will acquire after a plurality of operating cycles of the fuel cell, wherein the compression set occurs when thickness change of the gas diffusion layer in response to an operating cycle becomes substantially zero;
   obtaining the selected gas diffusion layer material, wherein the gas diffusion layer material has been subjected to a manufacturing process, wherein the manufacturing process may selectively include at least one compression and compression unloading process;
   determining whether the gas diffusion layer material has the compression set;
   compression set conditioning the gas diffusion layer if the gas diffusion layer does not have the compression set in order to impart upon the gas diffusion layer material the compression set, said compression set conditioning comprising at least one performance of the steps of:
      compressing the gas diffusion layer, wherein said step of compressing is performed outside the fuel cell and prior to assembly of the fuel cell; and
      compression unloading the gas diffusion layer, wherein said step of compression unloading is performed outside the fuel cell and prior to assembly of the fuel cell;
   wherein in response to said steps of compressing and compression unloading, the gas diffusion layer has substantially the compression set prior to assembly of the fuel cell.

2. The method of claim 1, wherein said step of compressing comprises subjecting the gas diffusion layer to a single compression cycle.

3. The method of claim 1, wherein said step of compressing comprises subjecting the gas diffusion layer to a plurality of compression cycles.

4. The method of claim 1, wherein the gas diffusion layer is a sheet, and wherein said step of compressing comprises simultaneously compressing a plurality of the sheets.

5. The method of claim 4, wherein said step of compressing comprises subjecting the plurality of sheets to a single compression cycle.

6. The method of claim 4, wherein said step of compressing comprises subjecting the plurality of sheets to a plurality of compression cycles.

7. A method for assembling a fuel cell, comprising the steps of:
   determining a structural configuration of a fuel cell;
   selecting a gas diffusion layer for the fuel cell;
   determining responsive to the structural configuration a compression set that the gas diffusion layer will acquire after a plurality of operating cycles of the fuel cell, wherein the compression set occurs when thickness change of the gas diffusion layer in response to an operating cycle becomes substantially zero;
   obtaining the selected gas diffusion layer material, wherein the gas diffusion layer material has been subjected to a manufacturing process, wherein the manufacturing process may selectively include at least one compression and compression unloading process;
   determining whether the gas diffusion layer material has the compression set;
   compression set conditioning the gas diffusion layer if the gas diffusion layer does not have the compression set in order to impart upon the gas diffusion layer material the compression set, said compression set conditioning comprising at least one performance of the steps of:
      compressing the gas diffusion layer, wherein said step of compressing is performed outside the fuel cell and prior to assembly of the fuel cell; and
      compression unloading the gas diffusion layer, wherein said step of compression unloading is performed outside the fuel cell and prior to assembly of the fuel cell;
   wherein in response to said steps of compressing and compression unloading, the obtained gas diffusion layer has substantially the compression set prior to assembly of the fuel cell; and
   assembling the fuel cell inclusive of the gas diffusion layer.

8. The method of claim 7, wherein said step of compressing comprises subjecting the gas diffusion layer to a single compression cycle.

9. The method of claim 7, wherein said step of compressing comprises subjecting the gas diffusion layer to a plurality of compression cycles.

10. The method of claim 7, wherein the gas diffusion layer is a sheet, and wherein said step of compressing comprises simultaneously compressing a plurality of the sheets.

11. The method of claim 10, wherein said step of compressing comprises subjecting the plurality of sheets to a single compression cycle.

12. The method of claim 10, wherein said step of compressing comprises subjecting the plurality of sheets to a plurality of compression cycles.

* * * * *